United States Patent
Kreulen et al.

(10) Patent No.: US 6,862,586 B1
(45) Date of Patent: Mar. 1, 2005

(54) SEARCHING DATABASES THAT IDENTIFYING GROUP DOCUMENTS FORMING HIGH-DIMENSIONAL TORUS GEOMETRIC K-MEANS CLUSTERING, RANKING, SUMMARIZING BASED ON VECTOR TRIPLETS

(75) Inventors: Jeffrey Thomas Kreulen, San Jose, CA (US); Vikas Krishna, San Jose, CA (US); Dharmendra Shantilal Modha, San Jose, CA (US); William Scott Spangler, San Martin, CA (US); Hovey Raymond Strong, Jr., San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/502,452

(22) Filed: Feb. 11, 2000

(51) Int. Cl.[7] .............................................. G06F 17/30
(52) U.S. Cl. ............................ 707/3; 707/7; 707/100; 707/102
(58) Field of Search .................... 707/1–10, 100–104.1, 707/200–205, 500.1–501.1, 512–515, 529–532, 900–902, 907–908; 382/224–225, 228, 230, 156–160, 305–308; 358/403; 706/15, 47–50; 345/440; 704/9–10

(56) References Cited

U.S. PATENT DOCUMENTS

| | | | | |
|---|---|---|---|---|
| 5,787,420 A | * | 7/1998 | Tukey et al. | 707/2 |
| 5,787,421 A | * | 7/1998 | Nomiyama | 704/7 |
| 5,819,258 A | * | 10/1998 | Vaithyanathan et al. | 707/2 |
| 5,835,905 A | | 11/1998 | Pirolli et al. | 707/3 |
| 5,857,179 A | * | 1/1999 | Vaithyanathan et al. | 707/2 |
| 5,864,845 A | * | 1/1999 | Voorhees et al. | 707/1 |
| 5,895,470 A | * | 4/1999 | Pirolli et al. | 707/101 |
| 5,920,859 A | * | 7/1999 | Li | 707/10 |
| 6,012,058 A | * | 1/2000 | Fayyad et al. | 707/2 |
| 6,038,574 A | | 3/2000 | Pitkow et al. | 707/513 |
| 6,115,708 A | * | 9/2000 | Fayyad et al. | 707/3 |
| 6,256,648 B1 | | 7/2001 | Hill et al. | 707/501 |
| 6,298,174 B1 | * | 10/2001 | Lantrip et al. | 358/403 |
| 6,363,379 B1 | * | 3/2002 | Jacobson et al. | 707/5 |
| 6,460,036 B1 | | 10/2002 | Herz | 707/10 |

OTHER PUBLICATIONS

Structuring and Visualising the WWW by Generalised Similarity Analysis, Chaomei Chen, In proceedings of Hypertext '97 (Southampton, England, Apr. 1997), pp. 177–186.

Interactive Clustering for Navigating in Hypermedia Systems, Sougata Mukherjea, James D. Foley, Scott E. Hudson, ACM Press, 1994.

From Latent Semantics to Spatial Hypertext An Integrated Approach, Chaomei Chen, Mary Czerwinski, In Proceedings of Hypertext '98, Pittsburgh, PA, USA, 1998. pp. 77–86.

HyPursuit: A Hierarchial Network Search Engine that Exploits Content–Link Hypertext Clustering, Ron Weiss, Bienvenido Velez, Mark A. Sheldon, Chanathip Namprempre, Peter Szilagyi, Andrzej Duda, David K. Gifford, In Proceedings of Hypertext '96, Washington, D.C., USA, pp. 180–193.

Information Retrieval Data Structures & Algorithms, William B. Frakes, Ricardo Baeza–Yates, Prentice Hall PTR, Upper Saddle River, New Jersey, 1992., Chapter 16, pp. 419–442.

* cited by examiner

Primary Examiner—Srirama Channavajjala
(74) Attorney, Agent, or Firm—Marc D. McSwain, Esq.; McGinn & Gibb, PLLC (57) ABSTRACT

A method and structure for performing a database search includes searching a database using a query (searching producing result items), and ranking the result items based on one or more of a frequency of an occurrence of in-links and out-links in each of the result items.

8 Claims, 4 Drawing Sheets

SEARCHING DATABASES THAT IDENTIFYING GROUP DOCUMENTS FORMING HIGH-DIMENSIONAL TORUS GEOMETRIC K-MEANS CLUSTERING, RANKING, SUMMARIZING BASED ON VECTOR TRIPLETS

BACKGROUND OF THE INVENTION

1. Field of the Invention

The present invention generally relates to searching and organizing a collection of hyperlinked, hypertext documents, such as those making up the World-wide-web. The present invention exploits the words (or terms) present in each of the documents and exploits the link structure (or link topology) between the hypertext documents to organize the document collection into various groups or clusters. The present invention also identifies typical documents in a group or a cluster. Finally, the present invention provides a way to rank documents in each of the groups. As an example, suppose a web search engine has returned a set of hyperlinked documents in response to a user search or query. The present invention provides a way to organize the set of returned documents into various groups or clusters.

2. Description of the Related Art

The explosive growth of the World-Wide-Web has created an abundance of hyperlinked document corpora. Prominent examples of such data are the IBM patent server, the Internet archive, and scientific literature. Mining the information present in such corpora represents a major contemporary scientific and technological challenge. Given a user query, today's Internet search engines may return a large number of relevant documents. Without effective summarization, it is a hopeless and enervating task to sort through all the returned documents in search of high-quality, representative information resources. In particular, what is needed is a technique that can aid in organizing, ranking, and effectively summarizing the gist or essence of the results returned by the Internet search engine.

SUMMARY OF THE INVENTION

It is, therefore, an object of the present invention to provide a structure, organization, and ranking method for viewing hyperlinked documents. The invention views hyperlinked documents as nodes in a directed graph whose edges are the hyperlinks between the documents, where each node contains some descriptive text. To systematically exploit the three-fold information: words, out-links, and in-links, each hyperlinked document is represented as a triplet of three unit vectors, respectively, of normalized word, out-link, and in-link frequencies. Out-links are links from a hypertext document, whereas in-links are links to a hypertext document. Geometrically, each document vector triplet can be thought of as a point on the surface of a high-dimensional torus. Such documents are clustered using a new clustering process, the toric k-means. The invention is illustrated by clustering the documents returned by an internet search engine for various queries. As a further illustration of the invention, each cluster is then summarized by seven informative nuggets of information. Finally, documents within each cluster are ranked in the order of typicality from the most typical to the least typical. The invention is quite effective in disambiguating the query words, in locating high-quality documents, and in concisely summarizing the retrieved documents.

One embodiment of the invention includes searching a database using a query (which produces result items), clustering the result items into logical categories, and ranking the result items within each category based on the frequency of the occurrence of words, the frequency of the occurrence of in-links, and the frequency of the occurrence of out-links in each of the result items. The frequency of the occurrence of words is, for a given result item, the number of unique words that are contained in the given result item. The frequency of the occurrence of out-links is, for a given result item, the number of other hypertext items (whether in the result set or not) that are linked to by or cited by or pointed to by the given result item. The frequency of the occurrence of in-links is, for a given result item, the number of other hypertext items (whether in the result set or not) that are linked to or cite or point to the result item.

In another embodiment, the invention comprises a method of performing a database search that includes, searching a database using a query, (the searching identifying a group of hyperlinked documents), forming a high-dimensional torus geometric representation of the hyperlinked documents, (wherein each hyperlinked document is represented by a vector triplet that includes a normalized word frequency, a normalized out-link frequency and a normalized in-link frequency), clustering the result items into clusters based on the high-dimensional torus geometric representation, ranking items within each of the clusters based on the high-dimensional torus geometric representation, and summarizing contents of the clusters based on the high-dimensional torus geometric representation.

The normalized out-link frequency includes the number of the hyperlinked documents linked to, cited, or pointed to by the hyperlinked document. The normalized in-link frequency includes the number of the hyperlinked documents linking to, citing, or pointing to the hyperlinked document. The normalized word frequency includes the number of unique words, terms, or n-grams contained in the hyperlinked document.

The clustering of the vector triplets on the high-dimensional torus geometric representation is performed using a toric k-means clustering process that uses a cosine-type similarity measure between document vector triplets, thereby producing clusters of vector triplets and producing a concept triplet for each of the clusters. The ranking includes a cosine-type similarity measure between document vector triplets.

The invention summarizes the clusters of vector triplets based on nuggets of information including, a closeness of the vector triplets in a cluster to the concept triplet for the cluster on the high-dimensional torus geometric representation, identifying the words with a highest normalized word frequency in the concept triplet for the cluster as the most frequent key-words for each of the clusters, identifying the out-links with a highest normalized out-link frequency in the concept triplet for the cluster as most frequent key out-links for each of the clusters, identifying the in-links with a highest normalized in-link frequency in the concept triplet for the cluster as most frequent important in-links for each cluster, identifying hypertext items relevant to the user's query by using a weighting of terms used in the query, identifying documents closest to the concept triplet as most typical documents in a cluster using a cosine-type textual content similarity measure between document vector triplets, identifying documents closest to the concept triplet as using a cosine-type out-link similarity measure between document vector triplets and most typical documents in a cluster, and identifying documents closest to the concept triplet as most typical documents in a cluster using a cosine-type in-link similarity measure between document vector triplets.

The toric k-means clustering process includes, forming initial clusters and computing concept vector triplets for each initial cluster formed, for each document vector triplet, finding the closest concept vector triplet using a cosine-similarity measure, assigning each document vector triplet to a closest concept vector triplet, recomputing new clusters as groups of document vectors assigned to a specific concept vector triplet, recomputing new concept vector triplets for the new clusters, repeating finding the closest concept vector triplet using a cosine-similarity measure, assigning each document vector triplet to a closest concept vector triplet, and recomputing new concept vector triplets for the new clusters. The clustering includes aggolomerative clustering, hierarchical clustering, EM algorithm, or mixture modeling. The ranking includes identifying a most typical vector triplet in each of the clusters of vector triplets.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF PREFERRED EMBODIMENTS OF THE INVENTION

The invention uses clustering to discover "latent classes" or "latent categories" in unstructured, unlabeled hyperlinked document copora. For a review of classical algorithms for clustering text documents, see E. Rasmussen, "Clustering Algorithms," in *Information Retrieval: Data Structures and Algorithms* (W. B. Frakes and R. Baeza-Yates, eds.), pp. 419–442, Prentice Hall, Englewood Cliffs, N.J., 1992, and P. Willet, "Recent Trends in Hierarchic Document Clustering: A Critical Review," *Information Processing & Management*, vol. 24, no. 5, pp. 577–597, 1988, incorporated herein by reference. For recent work on document clustering algorithms, see Cutting et al., "Scatter/Gather: A Cluster-Based Approach to Browsing Large Document Collections," in *ACM SIGIR*, 1992; Dhillon et al., Hearst et al., "Reexamining the Cluster Hypothesis: Scatter/Gather on Retrieval Results," in *ACM SIGIR*, 1996; Sahami et al., "SONIA: A service for Organizing Networked Information Autonomously," in *Digital Libraries 98:Proceedings of the Third ACM Conference on Digital Libraries*, New York, N.Y., pp. 200–209, ACM, 1999; Schütze et al., "Projections for Efficient Document Clustering," in *ACM SIGIR*, 1997; Silverstein et al., "Almost-Constant-Time Clustering of Arbitrary Corpus Subsets," in *ACM SIGIR*, 1997; Vaithyanathan and B. Dom et al., and Zamir et al., "Web Document Clustering: A Feasibility Demonstration," in *ACM SIGIR*, 1998, incorporated herein by reference.

The above papers focus on clustering using only the textual features of the documents. To the contrary, the invention includes a clustering invention that uses a link structure of the document corpora in addition to the commonly used textual features. Relevant documents tend to-be-more similar to each other than to non-relevant documents. The invention employs an enlarged notion of similarity that includes similarity in words as well as in link-topology.

A link structure has been used quite successfully to identify "hubs" and "authorities" in hyperlinked document corpora (see Chakrabarti et al., "Hypersearching the Web," *Scientific American*, June 1999, incorporated herein by reference). Kleinberg's (HITS) algorithms (see Kleinberg, J., "Authoritative sources in a hyperlinked environment," ACM-SIAM Symposium on Discrete Algorithms, 1998) and its refinements use an algebraic eigenvalue based approach. In comparison, the invention uses a geometric clustering based approach. Furthermore, HITS only uses the link structure and not the textual features.

One novel aspect of the invention is a geometric representation of hyperlinked documents as points on a high-dimensional torus. Each hyperlinked document is represented as a triplet of three unit vectors, respectively, of normalized word, out-link, and in-link frequencies. This is a natural extension of the classical vector space models of text data (see Salton et al., *Introduction to Modern Retrieval*, McGraw-Hill Book Company, 1983, incorporated herein by reference). Another novel aspect of the invention is a cosine-type similarity measure between document vector triplets. One more novel aspect of the invention is a geometric toric k-means clustering process that clusters points on the surface of a torus. An additional novel aspect of the invention is summarizing the content of each of the clusters using seven informative nuggets. A further novel aspect of the invention is ranking the documents within each cluster in the order of typicality.

The new clustering process, namely, the toric k-means, is a generalization of the classical, spherical k-means method (see Rasmussen, Supra, and Dhillon et al., Supra, respectively), in that the invention uses three different features: words, out-links, and in-link. Geometrically, each document vector triplet can be thought of as a point on the surface of a high-dimensional torus.

The invention is illustrated by the following example of clustering documents returned by an Internet search engine for the query "latent semantic indexing". For this query, the top document returned by the algorithm is the LSI home page at Bellcore (e.g., superbook.bellcore.com/~remde/lsi/LSI.html). The invention is quite effective in disambiguating the query words, in locating high-quality documents, and in concisely summarizing the retrieved documents (see Dhillon et al., Supra).

Each document x is represented as a triplet of unit vectors (D, F, B). These component vectors are to be thought of as column vectors. For each document x, the first vector D in the triplet is the unit vector of normalized word frequencies for each word that occurs in the document (e.g., words, terms, or n-grams). The basic idea is to eliminate stopwords, high-frequency words, and low-frequency words from the document collection. Suppose d unique words remain in the document collection after such elimination. For each document, the first vector D in the triplet will be a d-dimensional vector. For each column entry of D is the number of occurrences of the word corresponding to that column in the document x. Finally, the vector D is normalized to have a unit Euclidean norm. In the terminology of Salton et al., "Term-Weighting Approaches in Automatic Text Retrieval," *Information Processing & Management*, vol. 4, no. 5, p. 513:523, 1988, incorporated herein by reference, the invention uses a txn term-weighting scheme.

For each document x, the second vector F in the triplet is the unit vector of normalized out-link frequencies. The idea is to represent the second vector F as a f-dimensional vector, where f denotes the number of distinct documents that are pointed to by at least two other documents in the document collection. Thus, every entry in F has an in-degree at least 2. Thus, i-th column entry of F is the number of out-links from the document x to the document corresponding to the i-th column. Finally, the vector F is normalized to have a unit Euclidean norm.

For each document x, the third vector B in the triplet is the unit vector of normalized in-link frequencies. The idea is to represent the third vector B as a b-dimensional vector, where b denotes the number of distinct documents that point to at least two other documents in the document collection, again having an out-degree at least 2. Thus, i-th column entry of B is the number of in-links to the document x from the document corresponding to the i-th column. Finally, the vector B is normalized to have a unit Euclidean norm.

In one example, if there are n documents in the corpus, each document triplet is denoted as $$x_i=(D_i, F_i, B_i), 1 \leq i \leq n.$$

By construction, the component vectors $D_i$, $F_i$, and $B_i$ all have unit Euclidean norms, and, hence, can be considered points on the unit spheres in dimensions d, f, and b, respectively. Thus, the document triplet $x_i$ lies on the product space of three spheres, which is generically a torus. Furthermore, by construction, the individual entries of the component vectors $D_i$, $F_i$, and $B_i$ are nonnegative. Hence, the component vectors are in fact in the nonnegative orthants of $R^d$, $R^r$, and $R^b$, respectively.

Given document triplets x=(D, F, B) and x̃=(D̃, F̃, B̃), a measure of similarity between them is defined as a weighted sum of the inner products between the individual components. The similarity measure is completely novel and has not been considered in any prior art. Precisely, $$S(x\tilde{x})=\alpha_w D^T \tilde{D}+\alpha_f F^T \tilde{F}+\alpha_b B^T \tilde{B}$$

where $\alpha_w$, $\alpha_f$, and $\alpha_b$ are nonnegative numbers such that $$\alpha_w+\alpha_f+\alpha_b=1.$$

If $\alpha_w=1$, $\alpha_f=0$, and $\alpha_b=0$, then the classical cosine similarity between document vectors that has been widely used in information retrieval is obtained (see Salton et al., 1983, Supra). These parameters are tunable with the invention to assign different weights to words, outlinks, and in-links as desired.

Given n document vector triplets $x_1, x_2, \ldots, x_n$, let $\pi_1, \pi_2, \ldots, \pi_k$ denote a partitioning of the document vector triplets into k disjoint clusters. For each fixed $1 \leq j \leq k$, the concept triplet of the documents contained in the cluster $\pi_j$ is $$C_j=(D_j^*, F_j^*, B_j^*) \quad (1)$$

and $$D_j^* = \frac{\sum_{x \in \pi_j} D}{\left\| \sum_{x \in \pi_j} D \right\|}, \frac{\sum_{x \in \pi_j} F}{\left\| \sum_{x \in \pi_j} F \right\|}, \frac{\sum_{x \in \pi_j} B}{\left\| \sum_{x \in \pi_j} B \right\|} \quad (2)$$

where x=(D, F, B). The concept triplet is a triplet of the normalized mean vector or the normalized centroid vector of each of the three component vectors.

It is anticipated that k disjoint clusters $\pi_1^\dagger, \pi_2^\dagger, \ldots, \pi_k^\dagger$ are found such that the following is maximized:

$$\{\pi_j^\dagger\}_{j=1}^k = \operatorname*{argmax}_{\{\pi_j\}_{j=1}^k} \left( \sum_{j=1}^k \sum_{x \in \pi_j} S(x, c_j) \right)$$

In other words, "coherent" or "cohesive" clusters are sought such that within each cluster, the document vector triplets are as close as possible to the corresponding concept triplet.

Finding the optimal solution to the above maximization problem is NP-complete (e.g., see Theorem 3.1 of Kleinberg et al., "A Microeconomic View of Data Mining," *Data Mining and Knowledge Discovery*, vol. 2, pp. 311–324, December 1998, incorporated herein by reference).

The following is an approximation process, namely, the toric k-means process, which is an effective and efficient iterative heuristic. The first step is to start with an arbitrary partitioning of the document vectors, namely, $$\{\pi_j^{(0)}\}_{j=1}^k.$$

Let $$\{c_j^{(0)}\}_{j=1}^k$$

denote the concept triplets associated with the given partitioning. The index of iteration t is set to 0. The second step is, for each document vector triplet $x_i$, $1 \leq i \leq n$, to find the concept triplet that is closest to $x_i$. The new partitioning is computed $$\{\pi_j^{(t+1)}\}_{j=1}^k$$

induced by the old concept triplets $$\{c_j^{(t)}\}_{j=1}^k$$

$$\{\pi_j^{(t+1)}\} = \{x \in \{x_i\}_{i=1}^n : S(x, c_j^{(t)}), 1 \leq l \leq n\}, 1 \leq j \leq k. \quad (3)$$

In other words, $$\{\pi_j^{(t+1)}\}$$

is the set of all document vector triplets that are closest to the concept triplet $c_j^{(t)}$. If it happens that some document triplet is simultaneously closest to more than one concept triplet, then it is randomly assigned to one of the clusters. Clusters defined using equation (3) are known as Veronoi or Dirichlet partitions. The third step is to compute the new concept triplets corresponding to the partitioning computed in equation (3) by using equations (1)–(2) where instead of $\pi_j$, $$\{\pi_j^{(t+1)}\}$$

is used. If some "stopping criterion" is met, then $\pi_j^\dagger=\pi_j^{(t+1)}$ and $fc_j^\dagger=c_j^{(t+1)}$ or $1 \leq j \leq k$, and the process exits. Otherwise, t is incremented by 1, and processing returns to the second step. An example of a stopping criterion is if the change in the objective function, between two successive iterations, is less than some specified threshold.

Thus, the invention first arbitrarily partitions the document vectors and forms a concept triplet for each partition based on the document vectors in each arbitrary partition. Then, the invention creates clusters by assigning each document vector triplet to the cluster having the closest concept triplet. Therefore, each cluster has one concept triplet with document vector triplets grouped around it. New concept triplets are then calculated for each of the clusters. This process is repeated until the change between the old concept triplet and the new concept triplet is below a predetermined threshold.

The following example illustrates the operation of the invention. An Internet search engine may return a list of 200 documents in response to a user query. With the invention, each of these 200 documents are retrieved and, in this case, n=200. For each document, by using the text of these documents, the word-frequency component of the document vector triplet is computed by proceeding as mentioned above. For speed, instead of the full text of the documents, the summaries returned by the Internet search engine are sometimes used.

For each document, by parsing the hypertext of each document, the list of universal resource locators (URLs) pointed to by each document is obtained. Every URL that is not pointed to by at least 2 of the original 200 documents is deleted because the invention seeks only those documents which are similarly linked with other documents produced in response to the query. The out-link component of the document vector triplet is now computed by proceeding as mentioned above.

In one embodiment, using queries of the form "link: URL" on an Internet search engine, the URLs of the top 10 documents that point to each of the original 200 documents could be retrieved. Thus, in all, a total of roughly 2000 URLs that point to the original 200 documents are obtained. From this list of URLs, every URL that does not point to at least 2 of the original 200 documents is deleted. Finally, the in-link component of the document vector triplet is similarly computed, by proceeding as mentioned above.

At this point, the toric k-means algorithm is applied to the above document triplets to find k clusters.

For each cluster j, $1 \leq j \leq k$, the following seven nuggets of information are pertinent. First, the document that is closest to the concept triplet S (the document S has the most typical text, out-link, and in-link content in the cluster) is presented at the very top. The second nugget of information is that two or three most frequent words have the largest weight $D_j$ which provide a compact summary of the textual content of the documents in the cluster, and help disambiguate the query. Thirdly, the most frequent out-link has the largest weight $F_j$ which represents the document that is most frequently pointed to by the documents in the cluster. The fourth nugget is that the most frequent in-link has the largest weight $B_j$ which represents the document that points most frequently to the documents in the cluster. A fifth nugget is that the most typical document's D component that is closest to $D_j$ in cosine similarity represents the document that has the most typical textual content in the cluster. The sixth information nugget is that the most typical document's F component that is closest to $F_j$ in cosine similarity represents the document that has the most typical out-link content in the cluster. The last nugget is that the most typical document's B component that is closest to $B_j$ in cosine similarity represents the document that is most typically pointed to in the cluster.

Results for one query are discussed below (e.g., the query "latent semantic indexing"). The 200 documents returned by the Internet search engine are clustered into k=5 clusters using the inventive toric k-means process discussed above. The parameters $\alpha_w = \frac{1}{2}$, $\alpha_f = \frac{1}{4}$, and $\alpha_b = \frac{1}{4}$ are used in this example. In Table 1, the five clusters are presented. The LSI home page at Bellcore was the very first document returned by the invention. It is clear from table one below that each cluster is neatly summarized by the seven nuggets of information. In addition, these nuggets are an extremely useful aid to navigation and to word-sense disambiguation.

Similarly, in response to the query "string theory" the invention brings up "The Official String Theory home page" as S and in response to the query "Information Retrieval" the invention brings up "The SIGIR home page" as S.

TABLE 1

Table 1 illustrates five clusters for the query (e.g., latent semantic indexing).

| Cluster 0 | Latent Semantic Indexing [Bellcore] | |
|---|---|---|
| Size: 59 words | frequent latent-indexing, computer-science | typical dreamwave: Re: LSI (More Like This) |
| out-link | dreamwave by thread | dreamwave: Re: Excite NewsTracker |
| in-link | CS 384-Resources [U Chicago] | Latent Semantic Indexing [Bellcore] |
| Cluster 1 | Information Retrieval References (Arnon Rungsawang) | |
| Size: 51 words | frequent information-retrieval, research | typical Topics in IR (history; 1995) [U Mass] |
| out-link | www.cs.utk.edu/ . . . | 1. Introduction [Michael Berry's paper] |
| in-link | 403 Forbidden | IR References (Arnon Rungsawang) |
| Cluster 2 | Inf Information Retrieval of Imperfectly Recognized Handwriting | |
| Size: 43 words | frequent papers, utk | typical Using Relevance to Train . . . Experts |
| out-link | LSI Web Site [Berry and Dumais] | No Title |
| in-link | Information Retrieval Links | Recent papers by Peter Foltz |
| Cluster 3 | NERSC: Sparse Linear Algebra Algorithms for MPPs | |
| Size: 28 words out-link in-link | frequent publications, index T. G. Kolda Redirect Berkeley Lab Computing Sciences Research | typical CSD [Berkeley Lab] cv.html [Horst Simon] No Title [Horst Simon's paper]] |
| Cluster 4 | TREC6 Cross-Language Track | |
| Size: 19 words | frequent language, umd-dlrg | typical Resources on Cross-Language Text Retrieval |
| out-link in-link | www.glue.umd.edu/ . . . Cross-Language Text Retrieval Conferences | References TREC6 Cross-Language Track |

Figures 1, 2:
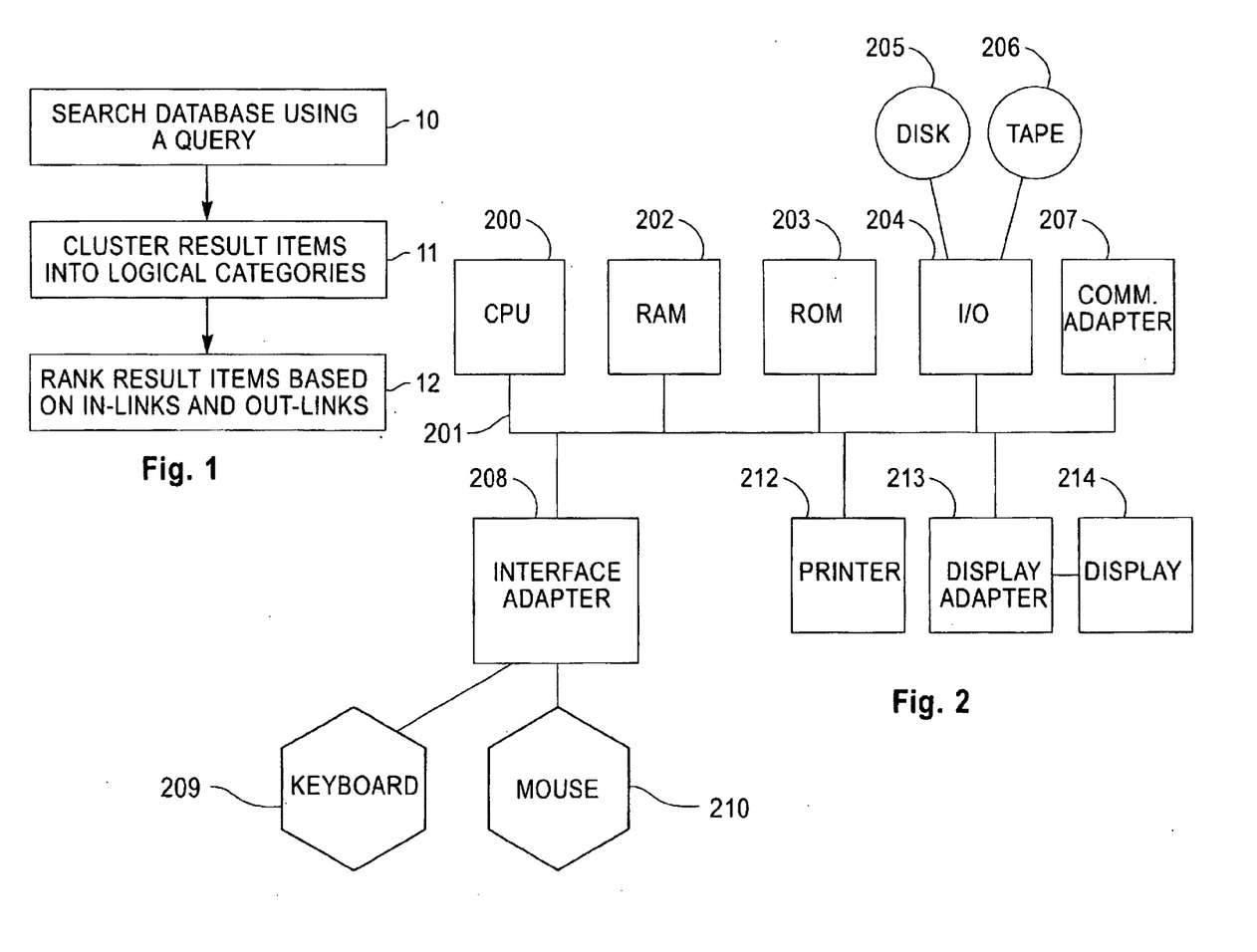
FIG. 1 is a flow diagram illustrating a preferred method of the invention.
FIG. 2 is a schematic diagram of a hardware embodiment of the invention.

FIG. 1 is a flowchart illustrating one embodiment of the invention. The inventive method includes searching a database using a query, as shown in item 10, clustering the result items into logical categories, as shown in item 11, and ranking the result items based on in-links and out-links, as shown in item 12.

While the overall methodology of the invention is described above, the invention can be embodied in any number of different types of systems and executed in any number of different ways, as would be known by one ordinarily skilled in the art. For example, as illustrated in FIG. 2, a typical hardware configuration of an information handling/computer system in accordance with the invention preferably has at least one processor or central processing unit (CPU) 200. For example, the central processing unit 200 could include various image/texture processing units, mapping units, weighting units, adders, subtractors, comparators, etc. Alternatively, as would be known by one ordinarily skilled in the art given this disclosure, multiple specialized CPU's (or other similar individual functional units) could perform the same processing, mapping, weighting, adding, subtracting, comparing, etc.

The CPU 200 is interconnected via a system bus 201 to a random access memory (RAM) 202, read-only memory (ROM) 203, input/output (I/O) adapter 204 (for connecting peripheral devices such as disk units 205 and tape drives 206 to the bus 201), communication adapter 207 (for connecting an information handling system to a data processing network) user interface adapter 208 (for connecting a peripherals 209, 210 such as a keyboard, mouse, microphone speaker and/or other user interface device to the bus 201), a printer 212, and display adapter 213 (for connecting the bus 201 to a display device 214). The invention could be implemented using the structure shown in FIG. 2 by including the inventive method within a computer program stored on the storage device 205. Such a computer program would act on information (e.g., a query) supplied through the interface units 209, 210 or through the network connection 207 (e.g., Internet connection). The system would then automatically produce the final desired product on the display 214, through the printer 212 or back to the network 207.

Figure 3:
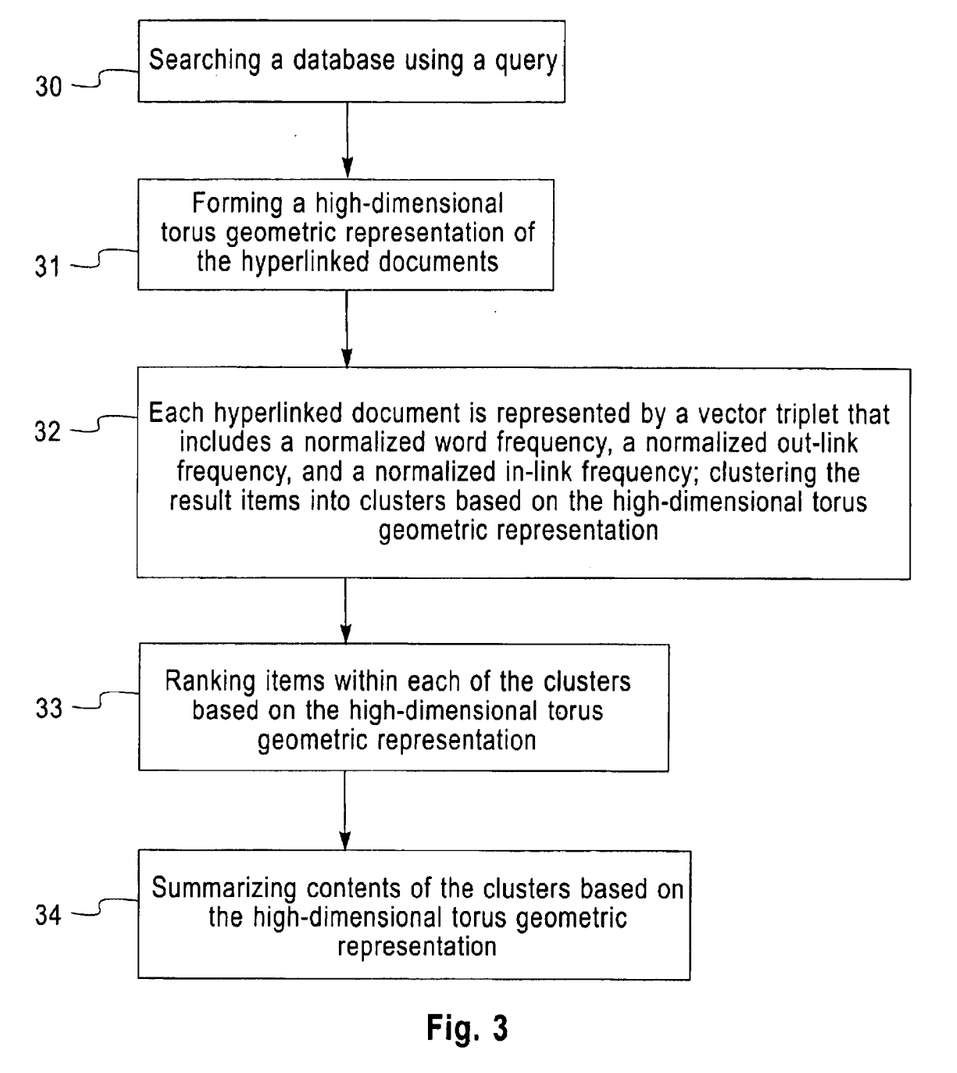
FIG. 3 is a flow diagram illustrating a preferred embodiment of the invention.

FIG. 3 is a flowchart illustrating another embodiment of the invention, which is discussed above. The inventive method includes: performing a database search that includes, searching a database using a query 30, the searching identifies a group of hyperlinked documents forming a high-dimensional torus geometric representation of the hyperlinked documents 31, wherein each hyperlinked document is represented by a vector triplet that includes a normalized word frequency, a normalized out-link frequency, and a normalized in-link frequency, clustering the result items into clusters based on the high-dimensional torus geometric representation 32; ranking items within each of the clusters based on the high-dimensional torus geometric representation 33; and summarizing contents of the clusters based on the high-dimensional torus geometric representation 34.

Figure 4:
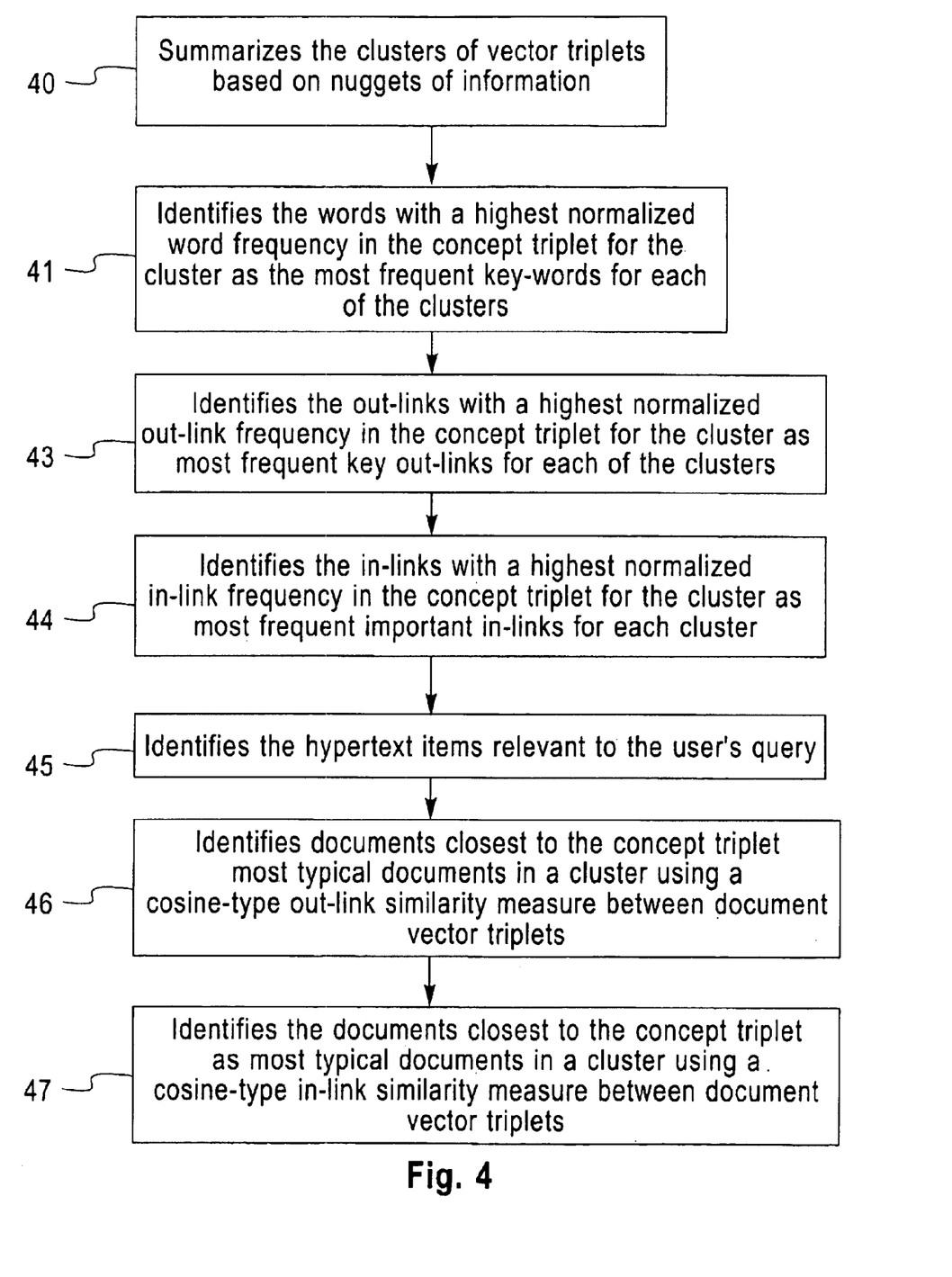
FIG. 4 is a flow diagram illustrating a preferred embodiment of the invention.

FIG. 4 is a flowchart illustrating a further embodiment of the invention, as discussed above, where the invention summarizes the clusters of vector triplets based on nuggets of information. More specifically, the invention identifies a closeness of the vector triplets in a cluster to the concept triplet for the cluster on the high-dimensional torus geometric representation 40, the words with a highest normalized word frequency in the concept triplet for the cluster as the most frequent key-words for each of the clusters 41, the out-links with a highest normalized out-link frequency in the concept triplet for the cluster as most frequent key out-links for each of the clusters 42, the in-links with a highest normalized in-link frequency in the concept triplet for the cluster as most frequent important in-links for each cluster 43, the hypertext items relevant to the user's query by using a weighting of terms used in the query 44, the documents closest to the concept triplet as most typical documents in a cluster using a cosine-type textual content similarity measure between document vector triplets 45, the documents closest to the concept triplet as most typical documents in a cluster using a cosine-type out-link similarity measure between document vector triplets 46, and the documents closest to the concept triplet as most typical documents in a cluster using a cosine-type in-link similarity measure between document vector triplets 47.

Figure 5:
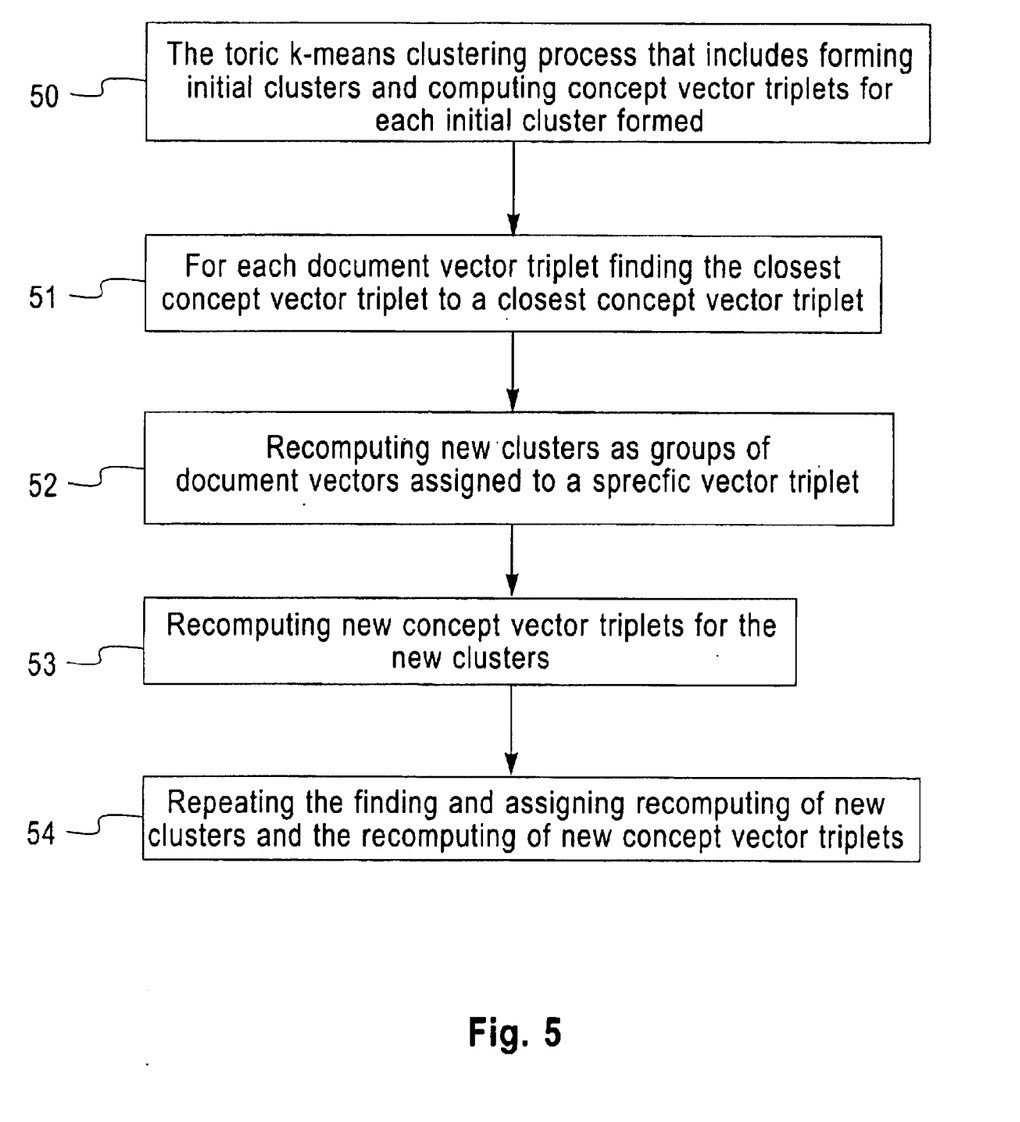
FIG. 5 is a flow diagram illustrating a preferred embodiment of the invention.

FIG. 5 is a flowchart the toric k-means clustering process, that includes forming initial clusters and computing concept vector triplets for each initial cluster formed 50, for each document vector triplet finding the closest concept vector triplet to a closest concept vector triplet 51, recomputing new clusters as groups of document vectors assigned to a specific vector triplet 52, recomputing new concept vector triplets for the new clusters 53, and repeating the finding and assigning, recomputing of new clusters, and the recomputing of new concept vector triplets 54.

Therefore, as described above, in one embodiment, the invention increases the performance of a query search into a database by ranking the results not only by textural features, but also by link-topology. In addition, the invention produces a cosine-type similarity between document rankings (e.g., based on textural and link-topology). Further, the invention clusters the results into different conceptual categories prior to the inventive ranking to further increase the performance of the query process. The invention is transparent to the user in that no additional input, other than that required for the conventional query, is required.

The invention is very useful in organizing unlabeled, unorganized hypertext documents. There are many applications of this basic process: knowledge management, searching and retrieval, ontology creation (like Yahoo!), etc. Any environment which can be interpreted either logically or physically as a collection of hyperlinked documents can benefit from the use of the above invention. The most important application of the present invention is to design better quality Internet search engines for the World-Wide-Web.

While the invention has been described in terms of preferred embodiments, those skilled in the art will recognize that the invention can be practiced with modification within the spirit and scope of the appended claims.

What is claimed is:

1. A method of perforating a database search comprising:
    searching a database using a query, said searching identifying a group of hyperlinked documents;
    forming a high-dimensional torus geometric representation of said hyperlinked documents, wherein each hyperlinked document is represented by a vector triplet comprising a normalized word frequency, a normalized out-link frequency and a normalized in-link frequency;
    clustering said result items into clusters based on said high-dimensional torus geometric representation;
    ranking items within each cluster of said clusters based on said high-dimensional torus geometric representation;
    summarizing contents of said clusters based on said high-dimensional torus geometric representation, wherein said clustering of the said vector triplets on said high-dimensional torus geometric representation is performed using a toric k-means clustering process that uses a cosine-type similarity measure between document vector triplets, thereby producing clusters of vector triplets and producing a concept triplet for each of the clusters; and
    summarizing said clusters of vector triplets based on nuggets of information including:

identifying a closeness of said vector triplets in a cluster to said concept triplet for said cluster on said high-dimensional torus geometric representation;

iidentifying said words with a highest normalized word frequency in said concept triplet for said cluster as the most frequent key-words for each of said clusters;

identifying said out-links with a highest normalized out-link frequency in the concept triplet for the cluster as most frequent key out-links for each of said clusters;

identifying said in-links with a highest normalized in-link frequency in the concept triplet for the cluster as most frequent important in-links for each cluster;

identifying hypertext items relevant to the user's query by using a weighting of terms used in said query;

identifying documents closest to said concept triplet as most typical documents in a cluster, using a cosine-type textual content similarity measure between document vector triplets; and identifying documents closest to said concept triplet as most typical documents in a cluster, using a cosine-type out-link similarity measure between document vector triplets; and identifying documents closest to said concept triplet as most typical documents in a cluster, using a cosine-type in-link similarity measure between document vector triplets.

2. A method of performing a database search comprising:

searching a database using a query, said searching identifying a group of documents;

forming a high-dimensional torus geometric representation of said documents, wherein each document is represented by a vector triplet comprising a normalized word frequency, a normalized out-link frequency and a normalized in-link frequency;

identifying documents closest to a concept triplet as most typical documents in a cluster, using a cosine-type out-link similarity measure between document vector triplets; and identifying documents closest to said concept triplet as most typical documents in a cluster, using a cosine-type in-link similarity measure between document vector triplets.

3. The method in claim 2, further comprising:

clustering said result items into clusters based on said high-dimensional torus geometric representation;

ranking items within each cluster of said clusters based on said high-dimensional torus geometric representation; and summarizing contents of said clusters based on said high-dimensional torus geometric representation.

4. The method in claim 3, wherein said clustering comprises agglomerative clustering, hierarchical clustering, EM algorithm, or mixture modeling.

5. The method in claim 3, wherein said ranking includes identifying a most typical vector triplet in each of said clusters of vector triplets.

6. The method in claim 2, wherein said normalized out-ink frequency comprises a number of said documents linked to, cited, or pointed to by said document.

7. The method in claim 2, wherein said normalized in-link frequency comprises a number of said documents linking to, citing, or pointing to said document.

8. The method in claim 2, wherein said normalized word frequency comprises a number of unique words, terms, or n-grams contained in said document.

* * * * *